United States Patent
Herrmann et al.

(10) Patent No.: US 11,198,285 B2
(45) Date of Patent: *Dec. 14, 2021

(54) ACTIVE TRANSPARENT DISPLAY FOR DYNAMIC MASKING DURING UV CURING IN A THREE DIMENSIONAL OBJECT PRINTER

(71) Applicant: Xerox Corporation, Norwalk, CT (US)

(72) Inventors: Douglas K. Herrmann, Webster, NY (US); Michael Jon Levy, Webster, NY (US); Seemit Praharaj, Webster, NY (US); Paul McConville, Webster, NY (US); Jason Matthew LeFevre, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 106 days.

This patent is subject to a terminal disclaimer.

(21) Appl. No.: 16/583,641

(22) Filed: Sep. 26, 2019

(65) Prior Publication Data
US 2020/0016884 A1    Jan. 16, 2020

Related U.S. Application Data

(63) Continuation of application No. 15/473,144, filed on Mar. 29, 2017, now Pat. No. 10,486,414.

(51) Int. Cl.
| | |
|---|---|
| *B33Y 50/02* | (2015.01) |
| *B33Y 10/00* | (2015.01) |
| *B33Y 30/00* | (2015.01) |
| *B29C 64/386* | (2017.01) |
| *B29C 64/112* | (2017.01) |

(52) U.S. Cl.
CPC ............ *B33Y 50/02* (2014.12); *B29C 64/112* (2017.08); *B29C 64/386* (2017.08); *B33Y 10/00* (2014.12); *B33Y 30/00* (2014.12)

(58) Field of Classification Search
CPC .......... B33Y 10/00; B33Y 50/02; B33Y 00/00
See application file for complete search history.

(56) References Cited

U.S. PATENT DOCUMENTS

| | | |
|---|---|---|
| 2002/0093115 A1 | 7/2002 | Jang et al. |
| 2009/0207203 A1 | 8/2009 | Yamamoto |
| 2011/0033887 A1 | 2/2011 | Fang et al. |
| 2013/0044172 A1 | 2/2013 | Nakajima |
| 2014/0265034 A1* | 9/2014 | Dudley .................. B33Y 30/00 264/401 |

* cited by examiner

*Primary Examiner* — Joseph A Miller, Jr.

(57) ABSTRACT

A print system and a method for curing marking material on an object using an active transparent display in a three dimensional (3D) object printer are disclosed. For example, the print system includes a plurality of printheads, a curing light source, a movable member to hold an object, an active transparent display and a controller to control movement of the movable member to move the object past the array of printheads, to operate the plurality of printheads to eject the marking material onto the object as the object passes the two-dimensional array of printheads, to control movement of the movable member, to control the active transparent display and to operate the curing light source to apply energy to cure the marking material, wherein the amount of energy that is applied to the object is controlled by a mask that is displayed on the active transparent display.

18 Claims, 5 Drawing Sheets

ACTIVE TRANSPARENT DISPLAY FOR DYNAMIC MASKING DURING UV CURING IN A THREE DIMENSIONAL OBJECT PRINTER

CROSS REFERENCE TO RELATED APPLICATIONS

This application is a continuation of U.S. patent application Ser. No. 15/473,144, filed Mar. 29, 2017, which was recently allowed, which is herein incorporated by reference in its entirety.

The present disclosure relates generally to curing systems and, more particularly, to an active transparent display for dynamic masking during UV curing in a three dimensional (3D) object printer and methods for using the same.

BACKGROUND

Some printers use UV curable inks to print on articles and objects. UV curable inks are applied onto the article or object and a UV light source is used to cure the ink. The UV light source may be used to initiate a photochemical reaction that generates a crosslinked network of polymers. In other words, the ink is not simply "dried" where solvent is evaporated from the ink. Rather, the UV ink is cured such that the polymers in the UV ink undergo a chemical reaction to link or bond to the article or object.

A curing light source may be used to apply light to cure the UV curable ink. However, if the curing light source does not emit the proper amount of light, the UV curable ink may not completely cure. Uncured UV inks may emit some volatile organic compounds (VOCs). VOCs are considered to have a negative impact on the environment and the end user. Furthermore, if the UV ink is not completely cured, the UV ink that is printed onto the article or object may be wiped off.

Three dimensional objects have varying slopes, angles and curvatures that do not provide a flat and even surface for curing. As a result, different portions of the three dimensional object may be different distances away from the curing light source. The different distances may cause the curing light source to cure the UV curable ink on the three dimensional object at different rates. Thus, the UV curable ink may not be properly cured on different surfaces of the three dimensional object.

SUMMARY

According to aspects illustrated herein, there are provided a print system and a method for curing marking material on an object using an active transparent display in a three dimensional (3D) object printer. One disclosed feature of the embodiments is a print system that comprises a plurality of printheads arranged in a two-dimensional array, wherein each one of the plurality of printheads is configured to eject a marking material, a curing light source coupled to the two-dimensional array of the plurality of printheads, a movable member to hold an object, wherein the movable member is positioned parallel to a plane formed by the two-dimensional array of the plurality of printheads and the curing light source, an active transparent display positioned parallel to the plane, wherein the active transparent display is located in front of the curing light source between the curing light source and the movable member and a controller to control movement of the movable member to move the object past the array of printheads, to operate the plurality of printheads to eject the marking material onto the object as the object passes the two-dimensional array of printheads, to control movement of the movable member, to control the active transparent display to display a mask that follows the object as the object moves past the active transparent display and to operate the curing light source to apply energy to cure the marking material, wherein the amount of energy that is applied to the object is controlled by the mask that is displayed on the active transparent display.

Another disclosed feature of the embodiments is a method for curing marking material on an object using an active transparent display in a three dimensional (3D) object printer. In one embodiment, the method comprises ejecting the marking material onto the object via a two-dimensional array of a plurality of printheads towards a curing light source, activating the active transparent display to display a mask when an image printed on the object crosses an edge of the active transparent display and curing the marking material on the object via the curing light source, wherein the amount of light for curing the marking material on different locations of a surface of the object is controlled by the mask displayed on the active transparent display.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses an apparatus and method for curing marking material on an object using an active transparent display. As discussed above, some printers use UV curable inks to print on articles and objects. UV curable inks are applied onto the article or object and a UV light source is used to cure the ink. The UV light source may be used to initiate a photochemical reaction that generates a crosslinked network of polymers. In other words, the ink is not simply "dried" where solvent is evaporated from the ink. Rather, the UV ink is cured such that the polymers in the UV ink undergo a chemical reaction to link or bond to the article or object.

A curing light source may be used to applying light to cure the UV curable ink. However, if curing light source malfunctions or does not emit the proper amount of light, the UV curable ink may not completely cure. Uncured UV inks may emit some volatile organic compounds (VOCs). VOCs are considered to have a negative impact on the environment and the end user. Furthermore, if the UV ink is not completely cured, the UV ink that is printed onto the article or object may be wiped off.

Three dimensional objects have varying slopes, angles and curvatures that do not provide a flat and even surface for curing. As a result, different portions of the three dimensional object may be different distances away from the curing light source. The different distances may cause the curing light source to cure the UV curable ink on the three dimensional object at different rates. Thus, the UV curable ink may not be properly cured on different surfaces of the three dimensional object.

Embodiments of the present disclosure provide a novel apparatus and method that control the amount of light from a curing light source that contacts a surface of an object to cure marking material on the surface of the object. For example, marking material that is on surfaces that are closer to the curing light source may require less light to cure than marking material that is on surfaces that are father away from the curing light source. The embodiments of the present disclosure provide an active transparent display that can be used in the 3D object printer that may control the amount of light that reaches surfaces of the object that are at different distances away from the curing light source. As a result, the embodiments of the present disclosure provide more control of the curing process and more consistent curing over all surfaces of the object that have the marking material.

Figure 1:
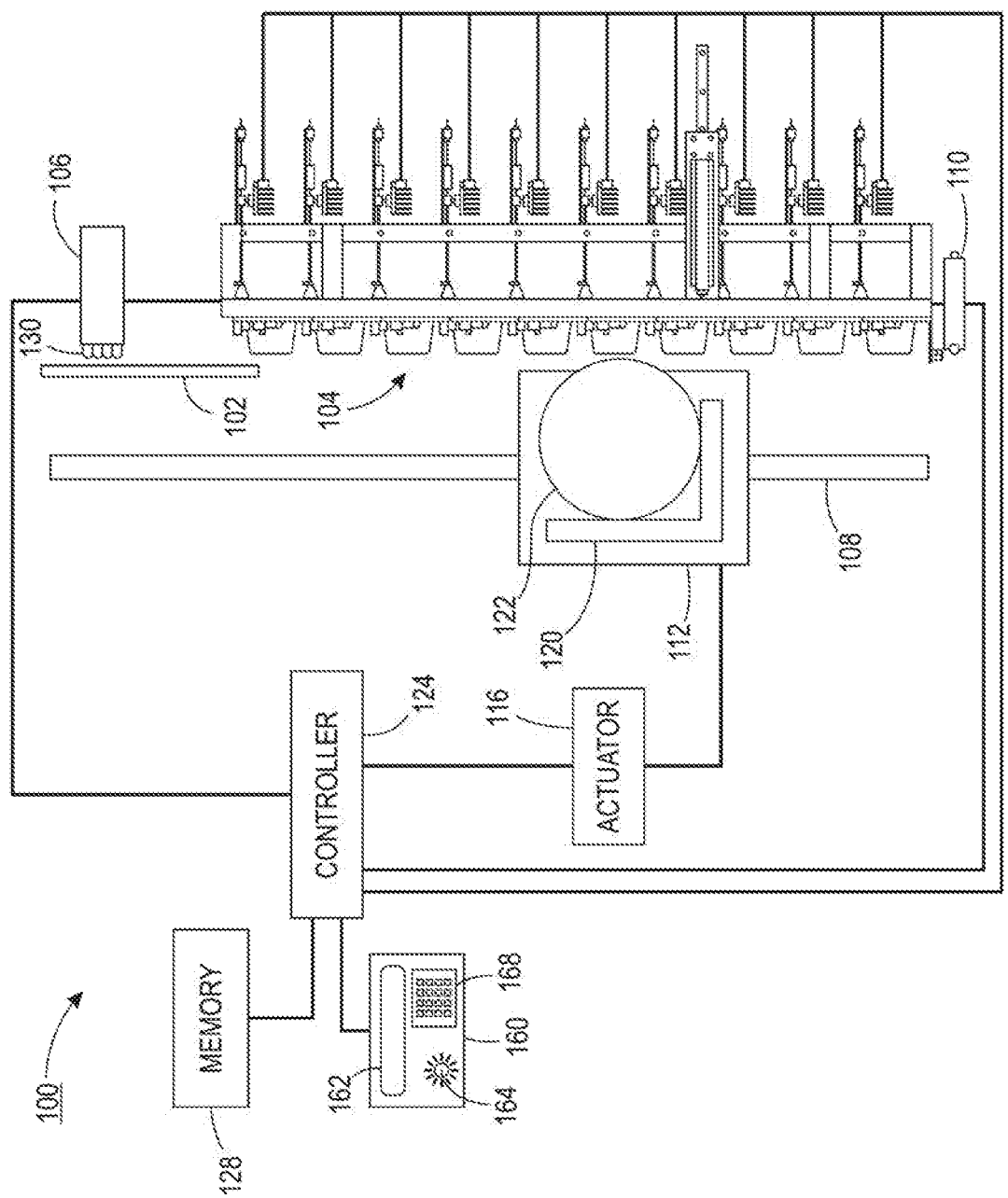
FIG. 1 illustrates an example 3D object printer of the present disclosure.

FIG. 1 illustrates an exemplary printing system 100 configured to print on an object 122. The object 122 may be a three dimensional (3D) object that has an irregular shape. For example, the object 122 may have one or more different curved surfaces with different amounts of curvature. Said another way, the object 122 may not have a flat surface.

In one embodiment, the printing system 100 includes an array, or a plurality, of printheads 104, a support member 108, a member 112 movably mounted to the support member 108, an actuator 116 operatively connected to the movably mounted member 112, an object holder 120 configured to mount to the movably mounted member 112 and a controller 124 operatively connected to the plurality of printheads and the actuator. As shown in FIG. 1, the array of printheads 104 is arranged in a two-dimensional array, which in the figure is a 10×1 array, although other array configurations can be used. Each printhead is fluidly connected to a supply of marking material (not shown) and is configured to eject marking material received from the supply. Some of the printheads can be connected to the same supply or each printhead can be connected to its own supply so each printhead can eject a different marking material.

In one embodiment, the marking material may be an ultra violet (UV) ink. The marking material may be cured by a curing light source 106. The curing light source 106 may be positioned to cure the marking material after the marking material is ejected by the array of printheads 104. For example, the curing light source 106 may be positioned vertically above or below the array of printheads 104 depending on which direction printing occurs along the support member 108. Said another way, the curing light source 106 may be stacked above or below the array of printheads 104 along a plane formed by the array of printheads 104.

In one embodiment, the controller 124 may also be operatively coupled to the curing light source 106 to control an amount and a duration of light applied to the marking material for curing. In other words, the curing light source 106 may be used to initiate a photochemical reaction that generates a crosslinked network of polymers. In other words, the ink is not simply "dried" where solvent is evaporated from the ink. Rather, the marking material (e.g., the UV ink) is cured such that the polymers in the marking material undergo a chemical reaction to link or bond to the object 122.

In one embodiment, the curing light source 106 may include a two dimensional array of light emitting diodes (LEDs) 130. The LEDs 130 may be UV emitting LEDs that can cure the marking material. Each one of the LEDs 130 may be independently addressable. In other words, the luminosity or light intensity of each LED 130 within the two dimensional array of LEDs 130 may be controlled independent of the other LEDs 130.

In one embodiment, the print system may include an active transparent display 102 that is located in front of the curing light source 106 and between the curing light source 106 and the movably mounted member 112. The active transparent display 102 may be secured or in a fixed position. The active transparent display 102 may be located between the object 122 and the curing light source 130 such that light emitted from the LEDs 130 may go through the active transparent display 102 and then contact the surface of the object 122.

In one embodiment, the active transparent display 102 may be coupled to a frame or a housing of the print system 100. It should be noted that FIG. 1 illustrates a simplified cross-sectional view of the print system 100. Thus, the frame or housing that the active transparent display 102 would be mounted to is not shown.

In one embodiment, the active transparent display 102 may be optically clear to allow a user to see through the active transparent display 102 when none of the pixels are active. When pixels are activated, the images can be formed on portions of the active transparent display 102. Depending on a color that is displayed (e.g., different gray scale levels or colors), the level of opaqueness can be controlled from being optically clear to completely opaque and different levels of opaqueness in between.

In one embodiment, the active transparent display 102 may be a liquid crystal display (LCD) or an organic light emitting diode (OLED) display. For example, the LCD may modulate ambient light that passes through the display. The OLED display may comprise an emissive and conductive layer. Electrical impulses may travel through the conductive layer and produce light at the emissive layer. The OLED display may produce their own light and provide more design flexibility.

Figure 2:
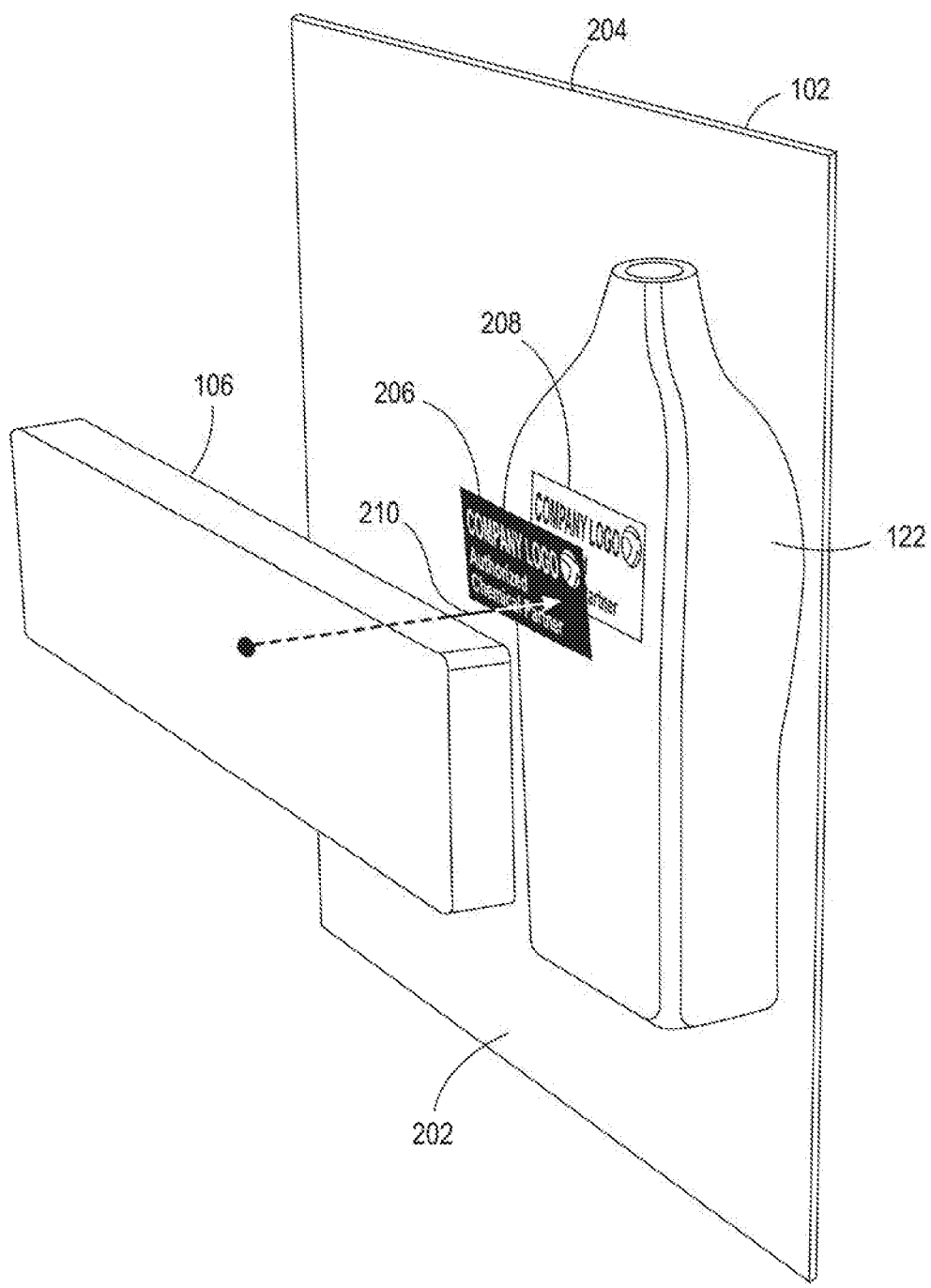
FIG. 2 illustrates an example of an active transparent display.

FIG. 2 illustrates an example of the active transparent display 102. In one embodiment, the active transparent display 102 may generate and display a mask 206. In one embodiment, the mask 206 may be a complementary image of an image 208 printed on the object 122 via the marking material. For example, the complementary image of the image 208 may be completely opaque, or activate a pixel to have a black color, in front of surfaces of the object 122 that have no marking material. In addition, the complementary image of the image 208 may have a varying degree of opaqueness created by activated pixels in the active transparent display 102 in front of surfaces of the object 122 that have marking material.

In one embodiment, the level of opaqueness may be a function of a distance between the curing light source 106 and a location of the surface in front of the curing light source 106. For example, a portion, or a pixel, of the active transparent display 102 that is in front of the surface that is furthest away from the curing light source 106 may be deactivated to be optically clear to allow more light to pass through to cure the marking material. As the surfaces are closer to the curing light source 106 the pixels of the active transparent display may be activated to have a gray scale value that is gradually darker to allow less light to pass through to cure the marking material.

In one embodiment, a plurality of different gray values may be used to control a level of opaqueness of a single pixel within the active transparent display 102. In one embodiment, different colors may be used to control a level of opaqueness of a single pixel within the active transparent display 102.

In one embodiment, the mask 206 may follow the image 208 as the object 122 moves past the curing light source 106 and the active transparent display 102. For example, if the object 122 is moving from a bottom edge 202 to a top edge 204, the mask 206 may be generated and displayed as soon as the image 208 crosses the bottom edge 202 of the active transparent display 102. In other words, when a first portion of the image 208 crosses the bottom edge 202, the corresponding portion of the mask 206 may be generated and displayed near the bottom edge 202 of the active transparent display 102.

In one embodiment, the mask 206 may mirror the movement of the image 208. For example, the mask 206 may move in a same direction as the image 208 and at a same velocity as the image 208 is moving. The mask 206 may mirror the movement of the image 208 when the size of the curing light source 206 is at least as large as the size of the active transparent display 102.

In another embodiment, the mask 206 may follow the image 208 at a slight offset to compensate for the angle of the image 208 relative to a center of the curing light source 106. When the mask 206 follows the image 208 at a slight offset, the mask may move at a different velocity than the velocity that the image 208 is moving.

Referring back to the slight offset, in one embodiment, the curing light source 106 may be smaller than the active transparent display 102. As a result, light emitted at extreme angles may contact the image 208. The image 208 may appear distorted or stretched at these extreme angles. For example, as flat images are moved to greater angles, the images be stretched so that they appear normal to a reader. One example, may be road signs printed on a road that appear to be a normal size, but are actually printed in a stretched or elongated fashion.

In one embodiment, the mask 206 may apply an amount of distortion to the complementary image of the mask 206 that is equal to the amount of distortion that appears in the image 208 at a particular angle relative to a normal view or center of curing light source 106. For example, when the image 208 is at a minimum distance from the curing light source 106 (e.g., directly in front of the curing light source 106) no distortion may be applied. However, as the distance of the image 208 increases from the center of the curing light source 106, the amount of distortion that is applied may be gradually increased. Similarly, as the distance of the image 208 decreases from the center of the curing light source 106, the amount of distortion that is applied may be gradually decreased.

Figure 3:
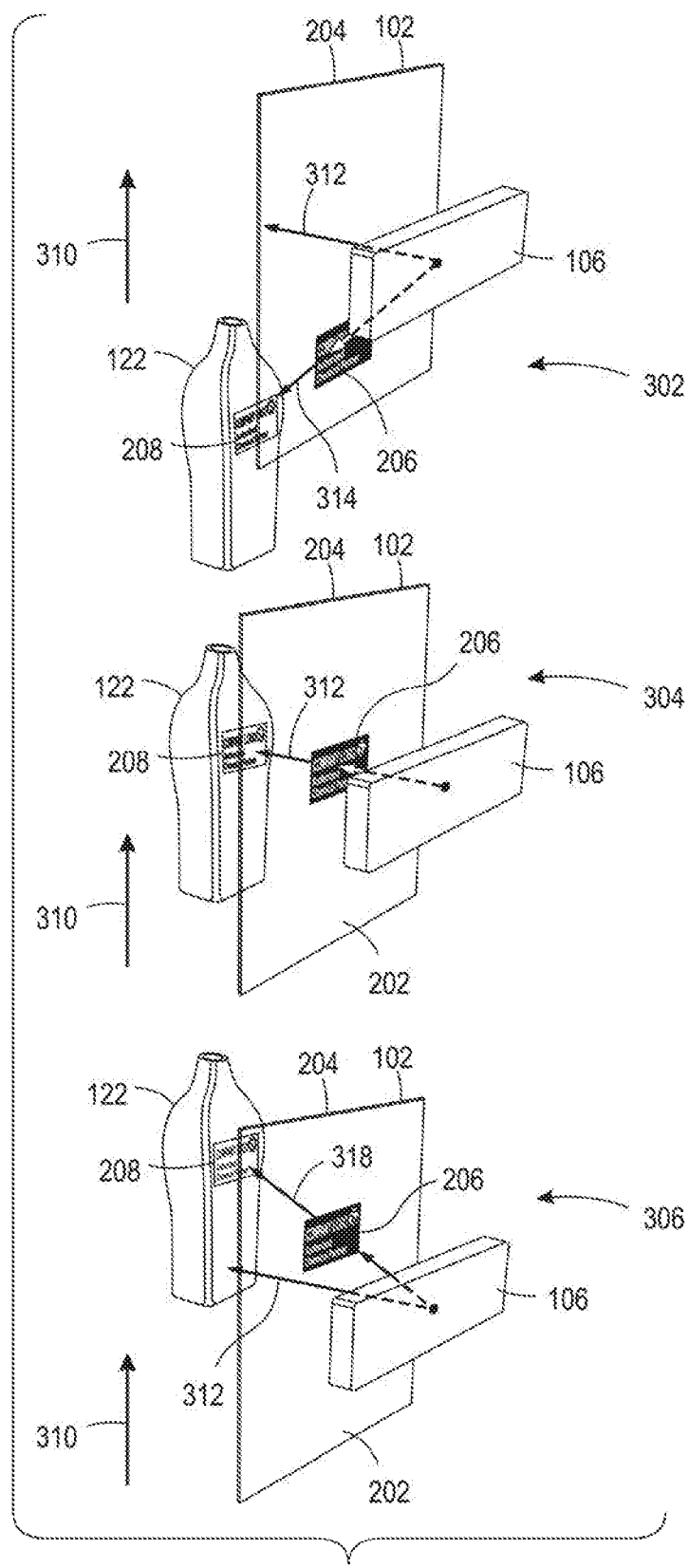
FIG. 3 illustrates an example of the active transparent display that displays a mask to cure an object.

FIG. 3 illustrates an example of the active transparent display 102 that displays the mask 206 at an offset to the image 208 to cure the marking material used to print the image 208 on the object 122 as the object 122 passes the curing light source 106. At block 302, the image 208 has crossed the bottom edge 202 of the active transparent display 102. The mask 206 may be displayed offset from the image 208.

In one embodiment, the complementary image displayed by the mask 206 may be distorted to compensate for the angle of the image relative to a center of the curing light source 106. For example, the image 208 may appear more stretched when looking downward in a direction as shown by an arrow 314 due to the angle relative to a normal, direct or perpendicular view as shown by an arrow 312. As a result, the mask 206 may display text or other portions of the complementary image with a distortion. As a result, the light emitted from the LEDs 130 of the curing light source 106 may accurately cure the marking material that forms the image 208 as the object 122 is moving vertically upwards towards the top edge 204 of the active transparent display 103. As the object 122 and the image 208 move closer to a minimum distance between the image 208 and a center of the curing light source 106, the amount of distortion may be gradually reduced.

At block 304, the image 208 is at the minimum distance from the center of the curing light source 106. In other words, a center of the image 208 is perpendicular to the line 312, which represents the normal, direct or perpendicular view. As a result, the distortion may be removed from the mask 206 and the mask 206 may be a mirror image of the image 208. The mask 206 may be positioned directly in front of the image 208 between the image 208 and the curing light source 106.

At block 306, the object 122 is moving past the curing light source 106 towards the top edge 204. As the image 208 moves away from the minimum distance from the center of the curing light source 106, the mask 206 may be positioned offset to the image 208. In addition, the amount of distortion applied to the mask 206 may be gradually increased again until the image 208 moves past the top edge 204. For example, the image 208 may appear to be stretched when looking upward in a direction as shown by an arrow 318 due to an angle relative to the normal view as shown by the arrow 312. The distortion may help to compensate for the stretched view of the image 208 to allow the light emitted from the LEDs 130 of the curing light source 106 to contact the correct portions of the surface of the object 122 having the marking material that forms the image 208.

In one embodiment, as the object 122 is moving past the curing light source 106, the operation of the LEDs 130 may be controlled by the controller 124 to prevent over heating the active transparent display 130. For example, Any LEDs 130 of the curing light source 106 that are not in front of a location on the surface of the object the contains any portion of the image 208 may not be activated. In another example, the LEDs 130 may be operated at a particular frequency. For example, the LEDs 130 may be turned on and off to prevent a constant amount of energy be applied through the active transparent display 102 and heat being accumulated in the active transparent display 102. In another example, the LEDs 130 that are in front of a fully activated black pixel of the active transparent display 102 may be deactivated. As a result, the curing light source 106 may be operated in a manner that does not over heat the active transparent display 102 that may lead to failure of the active transparent display 102.

Referring back to FIG. 1, the printing system 100 may include an optical sensor 110. The optical sensor 110 may be a scanner to scan a stock keeping unit (SKU), a barcode, or any other machine readable mark on the object 122. The SKU may provide information to the controller 124 with regards to image data that describes the image 208. The controller 124 may use the image data to then generate and display the mask 206 on the active transparent display 102.

In one embodiment, the optical sensor 110 may be used to scan the image 208. For example, the optical sensor 110 may scan the image 208 and transmit the scanned image data to the controller 124.

In one embodiment, the controller 124 may also be operatively coupled to an interface 160. The interface 160 may include a display 162, an annunciator 164 and an input device 168, such as a keypad. The interface 160 may be used to by an operator to provide image data to the controller 124. In one embodiment, the SKU of the object 122 that contains the image data may be entered by an operator via the input device 168 of the interface 160 instead of being scanned by the optical sensor 110.

In one embodiment, the support member 108 is positioned to be parallel to the plane formed by the array of printheads and, as shown in FIG. 1, is oriented so one end of the support member 108 is at a higher gravitational potential than the other end of the support member 108. This orientation enables the printing system 100 to have a smaller footprint than an alternative embodiment that horizontally orients the two-dimensional array of printheads and configures the support member, the member, and the object holder to enable the object holder to pass objects past the horizontally arranged printheads so the printheads can eject marking material downwardly on the objects.

The member 112 is movably mounted to the support member 108 to enable the member to slide along the support member 108. In some embodiments, the member 112 can move bi-directionally along the support member 108. In other embodiments, the support member 108 is configured to provide a return path to the lower end of the support member 108 to form a track for the member 112. The actuator 116 is operatively connected to the member 112 so that the actuator 116 can move the member 112 along the support member 108 and enable the object holder 120 connected to the member 112 to pass the two-dimensional array of the plurality of printheads 104 in one dimension of the two-dimensional array of printheads 104.

In the embodiment, the object holder 120 moves the object 122 along a length dimension of the array of printheads 104. The object holder 120 may have different shapes and sizes depending on a shape and size of the object 122. For example, different object holders 120 may be coupled to the member 112 for different objects 122. The object holder 120 may be custom built for each different type of object 122 that is used in the printing system 100.

As noted above, the printing system 100 may include the optical sensor 110. The optical sensor 110 may scan the SKU on the object 122 to provide additional information to the controller 124. For example, the SKU may also provide information such as how to control the array of printheads 104 to print an image onto the surface of the object 122. For example, different shaped objects 122 may have different printing profiles that may be included into the SKU.

In one embodiment, the optical sensor 110 may be a scanner that can scan the object 122 to determine a profile of the object 122. For example, the printing system 100 may determine a printing profile on-the-fly using the optical sensor 110. The surface profile scanned by the optical sensor 110 may be transmitted to the controller 124. The controller 124 may then calculate a sequence of operation of the printheads of the array of printheads 104 and an amount of marking material to eject from each printhead.

In one embodiment, the controller 124 is configured with programmed instructions stored in a memory 128 operatively connected to the controller so the controller can execute the programmed instructions to operate components in the printing system 100. Thus, the controller 124 is configured to operate the actuator 116 to move the object holder 120 past the array of printheads 104 and to operate the array of printheads 104 to eject marking material onto the object 122 held by the object holder 120 as the object holder 120 passes the array of printheads 104.

In one embodiment, the interface 160 may also be used to notify an operator if a printing program for a particular SKU is not available, display error messages, completion messages, and the like, on the display 162. The annunciator 164 may provide a warning light or an audible alarm to attract attention to messages on the display 162 or to indicate an error has occurred.

Additionally, the controller 124 is configured to operate the inkjets within the printheads of the array of printheads 104 so they eject drops with larger masses than the masses of drops ejected from such printheads. In one embodiment, the controller 124 operates the inkjets in the printheads of the array of printheads 104 with firing signal waveforms that enable the inkjets to eject drops that produce drops on surfaces of the object 122 having a diameter of about seven to about ten millimeters (mm). This drop size is appreciably larger than the drops that produced drops on the material receiving surface having a mass of about 21 nanograms (ng).

It should be noted that the orientation of the components of the printing system 100 is provided as an example. For example, FIG. 1 illustrates the printing process moved vertically upwards from the bottom of the page towards the top of the page. However, it should be noted that the components may be flipped such that the printing process may move vertically downwards from the top of the page to the bottom of the page.

The system configuration shown in FIG. 1 is especially advantageous in a number of aspects. For one, as noted above, the vertical configuration of the array of printheads 104 and the support member 108 enables the printing system 100 to have a smaller footprint than a system configured with a horizontal orientation of the array and support member. This smaller footprint of the printing system 100 enables the printing system 100 to be housed in a single cabinet and installed in non-production outlets. Once installed, various object holders can be used with the system to print a variety of goods that are generic in appearance until printed.

Another advantageous aspect of the printing system 100 shown in FIG. 1 is the gap presented between the objects 122 carried by the object holder 120 and the printheads of the array of printheads 104. The gap in this embodiment is in a range of about five to about six mm. Heretofore, the gap was maintained in a range centered about 1 mm. This smaller gap was thought to ensure a more accurate placement of drops from an ejecting printhead. It has been discovered that the greater gap width reduces the effect of laminar air flow in the gap between the printheads and the surface receiving the marking material drops so the accuracy of drop placement, especially for larger 3D objects, is maintained. This effect is particularly effective with the larger drop sizes noted previously. Without the turbulence produced by the movement of an object in close proximity to a printhead, the momentum of the ejected drops is adequate to keep the drops on their projected course so the registration of the drops from different printheads can be preserved for maintaining image quality. Additionally, the controller 124 can be configured with programmed instructions to operate the actuator 116 to move the object holder 120 at speeds that attenuate the air turbulence in the larger gap between the printhead and the surface of the object 122 used in the printing system 100.

Figure 4:
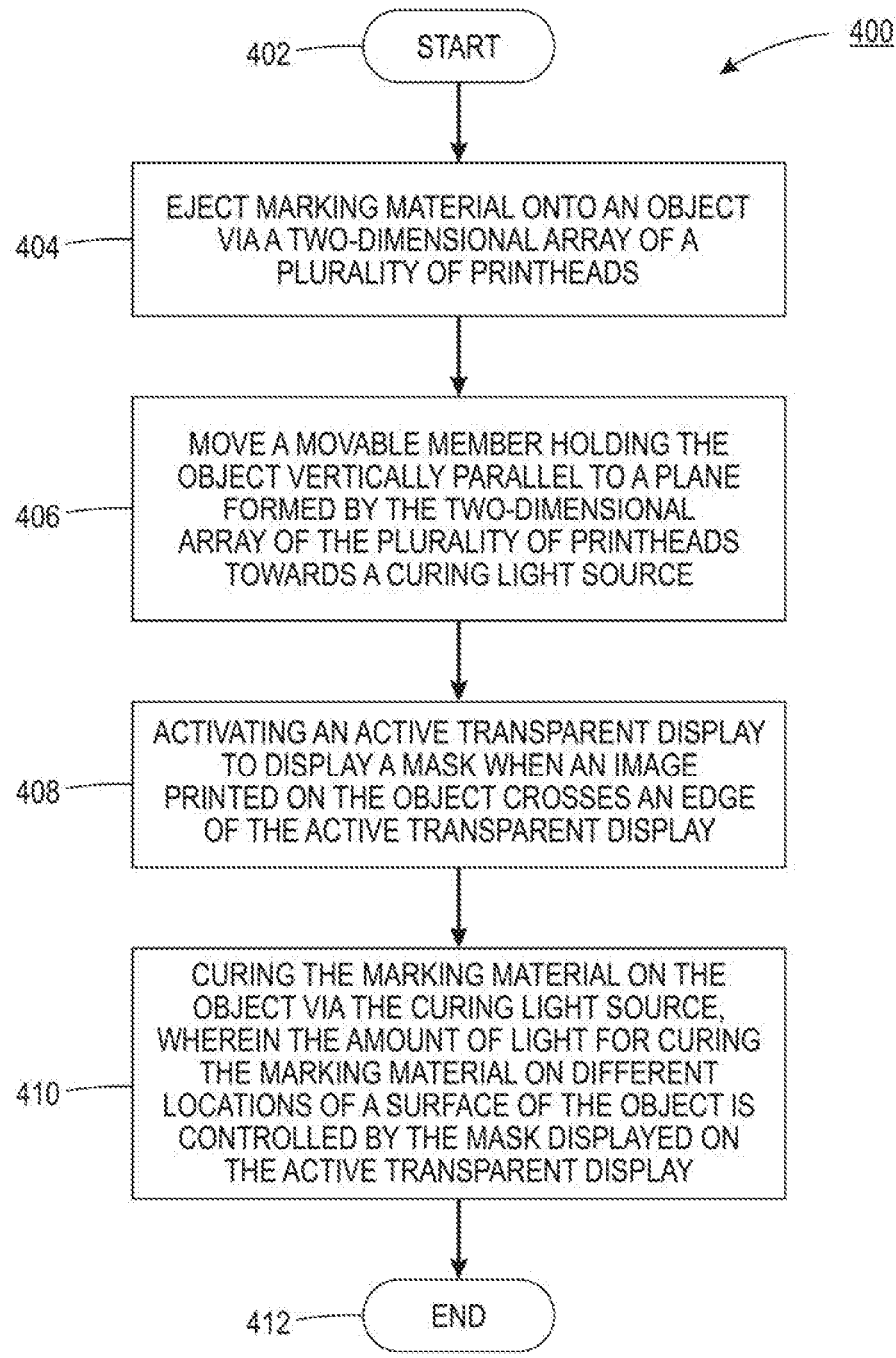
FIG. 4 illustrates a flowchart of an example method for curing marking material on an object using an active transparent display in a 3D object printer.
Figure 5:
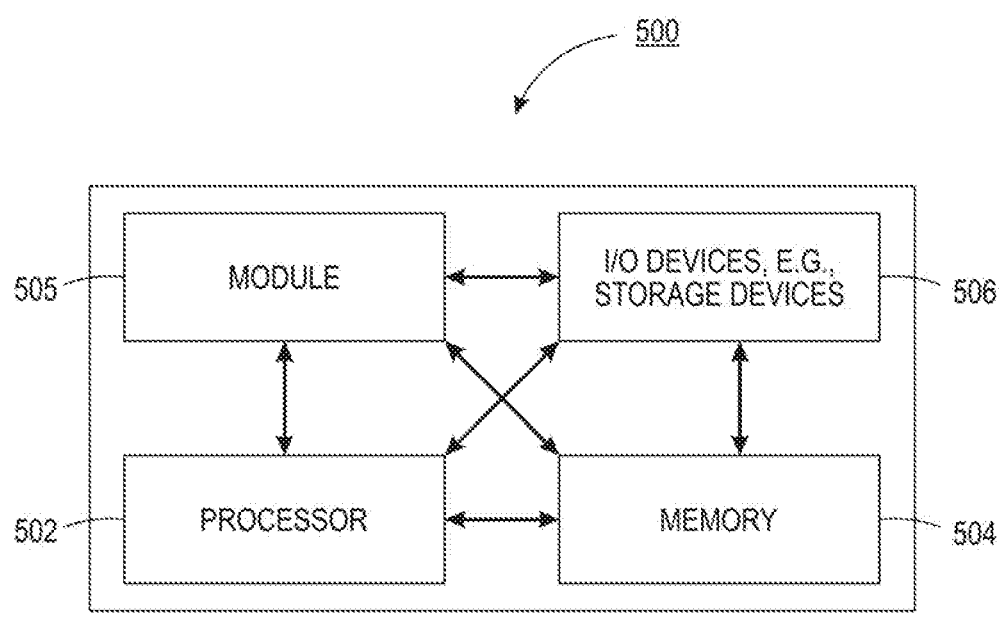
FIG. 5 illustrates a high-level block diagram of a computer suitable for use in performing the functions described herein.

FIG. 4 illustrates a flowchart of an example method 400 for curing marking material on an object using an active transparent display in a three dimensional (3D) object printer. In one embodiment, one or more steps or operations of the method 400 may be performed by the printing system 100 or a computer that controls operation of the printing system 100 as illustrated in FIG. 5 and discussed below.

At block 402, the method 400 begins. At block 404, the method 400 ejects marking material onto an object via a two-dimensional array of a plurality of printheads. For example, the object may be moved vertically up and down along a support member via a movable member and object holder. The printheads may have different colors. The object may be moved in front of the printheads to receive the marking material that is ejected from the printheads to form an image according to a printing process or program that is executed by the controller.

At block 406, the method 400 moves a movable member holding the object vertically parallel to a plane formed by the two-dimensional array of the plurality of printheads. After the printing on the object is completed, the object may be moved to a curing station to cure the marking material. In one embodiment, the plane may be an imaginary surface to which each one of the plurality of printheads may be aligned. The object may move parallel to this plane vertically up and down.

At block 408, the method 400 activates an active transparent display to display a mask when an image printed on the object crosses an edge of the active transparent display. For example, the mask may be a complementary image of the image that is printed onto the surface of the object. The mask may control an amount of light emitted from the curing light source that contacts the surface of the object that has received the marking material.

The complementary image (e.g., the image used as the mask) may use dark colored, or black colored pixels, in the active transparent display to block light from contact a corresponding surface that does not have any marking material. The complementary image may deactivate pixels that correspond to locations of a surface that have marking material and are furthest away from the curing light source.

The complementary image may use different shades of gray pixels or different colored pixels to control the amount of light that reaches different surfaces of the object that have marking material that are different distances away from the curing light source. For example, surfaces are closer to the curing light source may use darker shades of gray or darker colors to block more light and surfaces that are father away from the curing light source may use lighter shades of gray or lighter colors to block less light.

In one embodiment, the active transparent display may be activated to move the mask in a same direction and at a same velocity that the image printed on the object moves. In one embodiment, the mask may move at the same velocity that the image printed on the object moves when the mask moves as a mirror image of the image printed on the object.

In another embodiment, the mask may be moved with an offset to the image printed on the object. When the mask is moved with an offset to the image printed on the object, the mask may move at a different velocity than the velocity at which the image printed on the object is moving. In one embodiment, a distortion may be applied to the mask when the mask is offset from the image printed on the object. The amount of distortion that is applied may be a function of a distance that the image is from a minimum distance from a center of the curing light source. The amount of distortion may be greatest when the image that is printed on the object is furthest away from the minimum distance. The amount of distortion may be gradually decreased as the image that is printed on the object moves closer to the minimum distance from the center of the curing light source.

In one embodiment, the mask may be generated based on image data that is provided to the controller. In one embodiment, the image data may be obtained from scanning a SKU number on the object. In one embodiment, the image data may be obtained by scanning the image via an optical scanner. In one embodiment, the image data may be entered manually via an interface of the print system.

At block 410, the method 400 cures the marking material on the object via the curing light source, wherein the amount of light for curing the marking material on different locations of a surface of the object is controlled by the mask displayed on the active transparent display. For example, the light emitted by the LEDs of the curing light source may be controlled by the various activated or deactivated pixels of the active transparent display that generate the mask. At block 412, the method 400 ends.

It should be noted that the blocks in FIG. 4 that recite a determining operation or involve a decision do not necessarily require that both branches of the determining operation be practiced. In other words, one of the branches of the determining operation can be deemed as an optional step. In addition, one or more steps, blocks, functions or operations of the above described method 400 may comprise optional steps, or can be combined, separated, and/or performed in a different order from that described above, without departing from the example embodiments of the present disclosure.

FIG. 5 depicts a high-level block diagram of a computer that is dedicated to perform the functions described herein. As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for curing marking material on an object using an active transparent display in a three dimensional (3D) object printer, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for curing marking material on an object using an active transparent display in a three dimensional (3D) object printer (e.g., a software program comprising computer-executable instructions) can be loaded into memory 504 and executed by hardware processor element 502 to implement the steps, functions or operations as discussed above in connection with the example method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for curing marking material on an object using an active transparent display in a three dimensional (3D) object printer (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for curing marking material on an object using an active transparent display in a three dimensional (3D) object printer, comprising:
    ejecting the marking material onto the object via a two-dimensional array of a plurality of printheads;
    moving a movable member holding the object vertically parallel to a plane formed by the two-dimensional array of the plurality of printheads towards a curing light source;
    activating the active transparent display to display a mask when an image printed on the object crosses an edge of the active transparent display, wherein the activating the active transparent display to display the mask comprises:
        generating a complementary image of the image that is printed on the object via the marking material;
        moving the mask along the active transparent display to mirror a movement of the image as the image moves past the active transparent display; and
    curing the marking material on the object via the curing light source, wherein an amount of light for curing the marking material on different locations of a surface of the object is controlled by the mask displayed on the active transparent display.

2. The method of claim 1, wherein the generating the complementary image, comprises:
    identifying respective distances between different locations on the surface of the object from the curing light source;
    displaying a black pixel in front of one or more of the different locations that are closest to the curing light source;
    leaving a deactivated pixel in front of a second one or more of the different locations that are furthest from the curing light source; and
    selecting a gray scale pixel value that correspond to the respective distances of all remaining locations of the different locations.

3. The method of claim 1, wherein the activating the active transparent display to display the mask, comprises:
    applying a distortion to the mask when the image that is printed on the object is located at a distance that is greater than a minimum distance from a center of the curing light source.

4. The method of claim 3, wherein an amount of distortion that is applied is reduced as the object moves closer to the minimum distance from the center of the curing light source.

5. The method of claim 4, wherein the amount of distortion that is applied is increased as the object moves past the minimum distance from the center of the curing light source and further away from the minimum distance from the center of the curing light source.

6. A method for curing marking material on an object using an active transparent display in a three dimensional (3D) object printer, comprising:
    ejecting the marking material onto the object via a two-dimensional array of a plurality of printheads;
    moving a movable member holding the object vertically parallel to a plane formed by the two-dimensional array of the plurality of printheads towards a curing light source;
    activating the active transparent display to display a mask when an image printed on the object crosses an edge of the active transparent display, wherein the activating the active transparent display to display the mask, comprises:
        generating a complementary image of the image that is printed on the object via the marking material, wherein the generating the complementary image, comprises:
            identifying respective distances between different locations on the surface of the object from the curing light source;
            displaying a black pixel in front of one or more of the different locations that are closest to the curing light source;
            leaving a deactivated pixel in front of a second one or more of the different locations that are furthest from the curing light source; and
            selecting a gray scale pixel value that correspond to the respective distances of all remaining locations of the different locations; and
    curing the marking material on the object via the curing light source, wherein the amount of light for curing the marking material on different locations of a surface of the object is controlled by the mask displayed on the active transparent display.

7. The method of claim 6, wherein the activating the active transparent display to display the mask, comprises:
applying a distortion to the mask when the image that is printed on the object is located at a distance that is greater than a minimum distance from a center of the curing light source.

8. The method of claim 7, wherein an amount of distortion that is applied is reduced as the object moves closer to the minimum distance from the center of the curing light source.

9. The method of claim 8, wherein the amount of distortion that is applied is increased as the object moves past the minimum distance from the center of the curing light source and further away from the minimum distance from the center of the curing light source.

10. The method of claim 6, wherein the activating the active transparent display to display the mask, comprises:
moving the mask along the active transparent display in a same direction as the object.

11. The method of claim 6, wherein the activating the active transparent display to display the mask, comprises:
moving the mask at a same velocity along the active transparent display as the object is moving past the curing light source when the mask is a mirror image of the image printed on the object or moving the mask at a different velocity along the active transparent display as the object is moving past the curing light source when the mask is offset to the image printed on the object.

12. The method of claim 11, further comprising:
providing image data associated with the image printed on the object via the marking material to a controller, wherein the mask is activated on the active transparent display based on the image data by the controller.

13. A method for curing marking material on an object using an active transparent display in a three dimensional (3D) object printer, comprising:
ejecting the marking material onto the object via a two-dimensional array of a plurality of printheads;
moving a movable member holding the object vertically parallel to a plane formed by the two-dimensional array of the plurality of printheads towards a curing light source;
activating the active transparent display to display a mask when an image printed on the object crosses an edge of the active transparent display, wherein the activating the active transparent display to display the mask comprises:
identifying portions of a surface of the object that do not have the marking material; and
activating pixels that correspond to the portions of the surface of the object that do not have the marking material to have a black color; and
curing the marking material on the object via the curing light source, wherein an amount of light for curing the marking material on different locations of a surface of the object is controlled by the mask displayed on the active transparent display.

14. The method of claim 13, wherein the activating the active transparent display to display the mask, comprises:
adjusting an amount of distortion that is applied to the mask as the object moves past the active transparent display.

15. The method of claim 14, wherein the amount of distortion is increased as the object moves away from a center of the curing light source.

16. The method of claim 14, wherein an amount of distortion that is applied is reduced as the object moves towards the center of the curing light source.

17. The method of claim 13, wherein the activating the active transparent display to display the mask, comprises:
moving the mask along the active transparent display in a same direction as the object as the object moves in front of the active transparent display.

18. The method of claim 13, wherein the activating the active transparent display to display the mask, comprises:
moving the mask at a same velocity along the active transparent display as the object is moving past the curing light source when the mask is a mirror image of the image printed on the object or moving the mask at a different velocity along the active transparent display as the object is moving past the curing light source when the mask is offset to the image printed on the object.

* * * * *